United States Patent
Chen

(10) Patent No.: US 12,431,160 B2
(45) Date of Patent: Sep. 30, 2025

(54) VOICE SIGNAL DETECTION METHOD, TERMINAL DEVICE AND STORAGE MEDIUM

(71) Applicant: GOERTEK INC., Shandong (CN)

(72) Inventor: Guoming Chen, Shandong (CN)

(73) Assignee: GOERTEK INC., Weifang (CN)

( * ) Notice: Subject to any disclaimer, the term of this patent is extended or adjusted under 35 U.S.C. 154(b) by 277 days.

(21) Appl. No.: 18/044,954

(22) PCT Filed: Oct. 29, 2020

(86) PCT No.: PCT/CN2020/124896
§ 371 (c)(1),
(2) Date: Mar. 10, 2023

(87) PCT Pub. No.: WO2022/052246
PCT Pub. Date: Mar. 17, 2022

(65) Prior Publication Data
US 2023/0360666 A1    Nov. 9, 2023

(30) Foreign Application Priority Data
Sep. 10, 2020 (CN) .......................... 202010953527.1

(51) Int. Cl.
*G10L 25/78* (2013.01)
*G10L 25/09* (2013.01)
*G10L 25/18* (2013.01)

(52) U.S. Cl.
CPC .............. *G10L 25/78* (2013.01); *G10L 25/09* (2013.01); *G10L 25/18* (2013.01)

(58) Field of Classification Search
None
See application file for complete search history.

(56) References Cited

U.S. PATENT DOCUMENTS 8,315,854 B2    11/2012  Oh et al.
10,535,364 B1 *  1/2020  Zhong ..................... G10L 25/78
(Continued)

FOREIGN PATENT DOCUMENTS

CN    101399039 A    4/2009
CN    101601088 A    12/2009
(Continued)

OTHER PUBLICATIONS

International Search Report from International Application No. PCT/CN2020/124896 mailed Jun. 9, 2021.

*Primary Examiner* — Nicole A K Schmieder
(74) *Attorney, Agent, or Firm* — Shih IP Law Group, PLLC

(57) ABSTRACT

A voice signal detection method, a terminal device and a storage medium. Said method comprises: receiving a time domain signal detected by a bone conduction sensor in the terminal device, and acquiring time domain features in the time domain signal (S10); converting the time domain signal into a frequency domain signal, and acquiring frequency domain features in the frequency domain signal (S20); and when the time domain feature satisfies a first preset condition and the frequency domain feature satisfies a second preset condition, determining that a voice signal has been detected by the bone conduction sensor (S30). The voice detection is performed according to a signal detected by the bone conduction sensor, without the need of combining with a signal detected by a microphone, so that the voice detection is simpler, and moreover, as voice recognition is performed merely in combination with the bone conduction sensor, the cost is low.

9 Claims, 1 Drawing Sheet

(56) References Cited

U.S. PATENT DOCUMENTS

2005/0069162 A1    3/2005  Haykin et al.
2020/0184996 A1*  6/2020  Steele ...................... H04R 5/00

FOREIGN PATENT DOCUMENTS

| CN | 102314884 A | 1/2012 |
| CN | 104144377 A | 11/2014 |
| CN | 106714023 A | 5/2017 |
| JP | 08265887 A | 10/1996 |

* cited by examiner

VOICE SIGNAL DETECTION METHOD, TERMINAL DEVICE AND STORAGE MEDIUM

This application claims the priority of the Chinese patent application filed to the Chinese Patent Office on Sep. 10, 2020, with application number of 202010953527.1 and invention name of "voice signal detection method, terminal device and storage medium", and the entire content is incorporated in the present application by reference.

TECHNICAL FIELD

The present application relates to a field of communications, and in particular, to a voice signal detection method, a terminal device and a storage medium.

BACKGROUND TECHNOLOGY

In recent years, voice control has been favored by the majority of users due to its convenience. Since the microphone generally can detect voice and noise, errors may occur when the terminal device controls according to the voice. Generally, it is recognized whether the received signal is a voice signal, by using signals detected by the microphone and the bone conduction sensor simultaneously, however, this recognition process is too complicated.

SUMMARY

A main purpose of the present application is to provide a voice signal detection method, a terminal device and a storage medium, and is intended to simplify the recognition for the voice.

In order to achieve the above purpose, the present application provides a voice signal detection method, which is applied to a terminal device, and the voice signal detection method includes the following steps:
  receiving a time domain signal detected by a bone conduction sensor in the terminal device, and acquiring a time domain feature in the time domain signal;
  converting the time domain signal into a frequency domain signal, and acquiring a frequency domain feature in the frequency domain signal; and
    when the time domain feature satisfies a first preset condition and the frequency domain feature satisfies a second preset condition, determining that a voice signal has been detected by the bone conduction sensor.

Optionally, the step of acquiring a time domain feature in the time domain signal includes:
  acquiring a short-term zero-crossing rate of the time domain signal; and
  acquiring a pitch period of the time domain signal, the time domain feature comprises the short-term zero-crossing rate and the pitch period, and the first preset condition includes that the short-term zero-crossing rate is greater than a preset short-term zero-crossing rate and the pitch period is greater than a first preset pitch period and smaller than a second preset pitch period, and
  the step of acquiring a frequency domain feature in the frequency domain signal includes:
  acquiring a spectral center of gravity of the frequency domain signal, the frequency domain feature includes the spectral center of gravity, and the second preset condition includes that the spectral center of gravity is greater than a preset spectral center of gravity.

Optionally, the step of acquiring a short-term zero-crossing rate of the time domain signal includes:
  acquiring difference values between sign functions of adjacent sampling points in the time domain signal, wherein parameters of the sign functions are sampling signals of the sampling points respectively; and
  obtaining the short-term zero-crossing rate by summing up absolute values of each of the difference values.

Optionally, the step of acquiring a pitch period of the time domain signal includes:
  sampling the time domain signal in accordance with a preset period to obtain a sampling signal, and acquiring a reference signal after a preset time interval for the sampling signal; and
  acquiring a similarity between the sampling signal and the reference signal, and determining the pitch period according to the similarity.

Optionally, the step of acquiring a spectral center of gravity of the frequency domain signal includes:
  acquiring frequency and spectral energy of each of sampling points in the frequency domain signal, and calculating product of the frequency and the spectral energy of each of the sampling points;
  summing up products of corresponding sampling points to obtain a first sum value, and summing up spectral energies of the sampling points to obtain a second sum value; and
  acquiring a ratio of the first sum to the second sum to obtain the spectral center of gravity.

Optionally, the step of acquiring a frequency domain feature in the frequency domain signal further includes:
  acquiring a logarithmic spectral energy of the frequency domain signal;
  acquiring a spectral energy ratio of the frequency domain signal, the frequency domain feature further includes the logarithmic spectral energy and the spectral energy ratio of the frequency domain signal, and the second preset condition further includes that, the logarithmic spectral energy is less than a preset logarithmic spectral energy, and the spectral energy ratio is less than a preset spectral energy ratio.

Optionally, the step of acquiring a spectral energy ratio of the frequency domain signal further includes:
  acquiring amplitudes of sub-frequency domain microphone signals of sub-bands of a frequency domain microphone signal in a first preset frequency band, and determining a first spectral energy according to the amplitudes;
  acquiring amplitudes of sub-frequency domain microphone signals of sub-bands of a frequency domain microphone signal in a second preset frequency band, and determining a second spectral energy according to the amplitudes, the highest frequency in the first preset frequency band is less than the lowest frequency in the second preset frequency band; and
  acquiring a ratio of the first spectral energy to the second spectral energy, and obtaining the spectral energy ratio according to the ratio of the first spectral energy to the second spectral energy.

Optionally, the step of acquiring a logarithmic spectral energy of the frequency domain signal includes:
  acquiring amplitudes of sub-frequency domain microphone signals of sub-bands of a frequency domain microphone signal in a third preset frequency band, and determining a third spectral energy according to the amplitudes; and obtaining the logarithmic spectral energy by taking logarithm of the third spectral energy.

in addition, in order to achieve the above purpose, the present application further provides a terminal device, the terminal device includes a memory, a processor, and a voice signal detection program stored on the memory and executable by the processor, and when the voice signal detection program is executed by the processor, the voice signal detection method as described above is implemented.

In order to achieve the above purpose, the present application further provides a computer readable storage medium, which is characterized in that, the computer readable storage medium stores a voice signal detection program thereon, and when the voice signal detection program is executed by a processor, the steps of the voice signal detection method as described above are implemented.

The voice signal detection method, the terminal device and the storage medium proposed in this application receives a time domain signal detected by a bone conduction sensor in the terminal device, acquires a time domain feature in the time domain signal, converts the time domain signal into a frequency domain signal, acquires a frequency domain feature in the frequency domain signal, and when the time domain feature satisfies a first preset condition and the frequency domain feature satisfies a second preset condition, it is determined that the bone conduction sensor detects the voice signal, so that the voice detection can be performed according to the time domain signal detected by the bone conduction sensor, without being combined with the signal detected by the microphone, therefore the voice detection is simpler, in the meanwhile, the cost is lower since only the bone conduction sensor is combined in the recognition for the voice.

BRIEF DESCRIPTION OF DRAWINGS

In order to more clearly illustrate the embodiments of the present application or the technical solutions in the prior art, the following briefly introduces the accompanying drawings required for the description of the embodiments or the prior art. Obviously, the drawings in the following description are only a part of the drawings of the present application. For those of ordinary skill in the art, other drawings can also be obtained from the provided drawings without any creative effort.

DETAILED DESCRIPTION OF EMBODIMENTS

The technical solutions in the embodiments of the present application will be described below with reference to the drawings in the embodiments of the present application. Obviously, the described embodiments are only a part of the embodiments of the present application, rather than all the embodiments. Based on the embodiments in the present application, all other embodiments obtained by those of ordinary skill in the art without inventiveness efforts shall fall within the protection scope of the present application.

Figure 1:
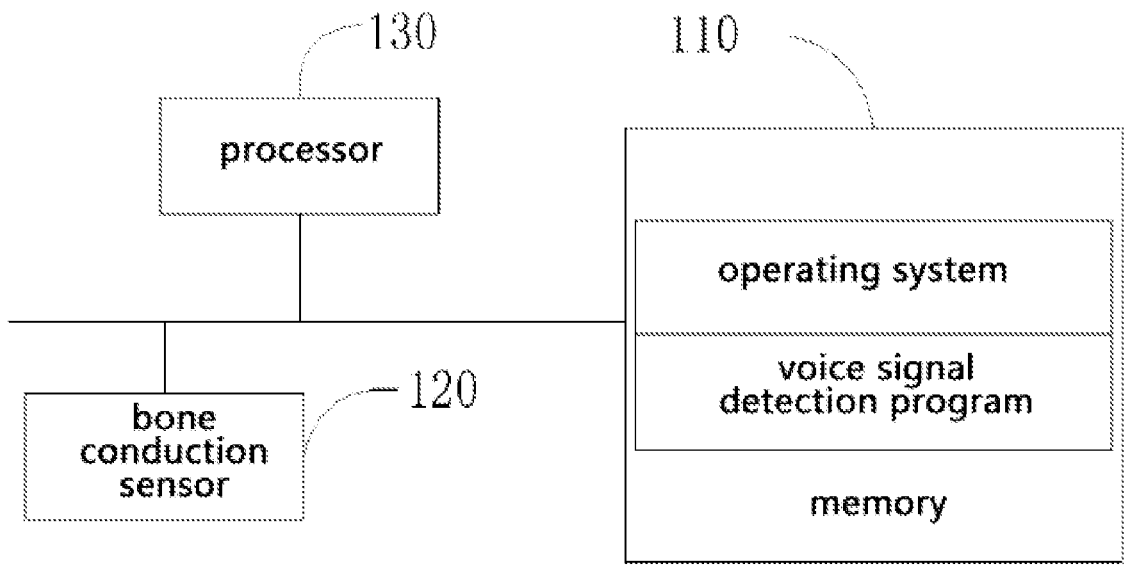
FIG. 1 is a schematic diagram of a hardware structure of a terminal device according to the voice signal detection method of the present application.

Referring to FIG. 1, FIG. 1 is a schematic diagram of a hardware structure of a terminal device according to the voice signal detection method of the present application.

As shown in FIG. 1, the terminal device according to this embodiment may be a wearable device worn on the head, such as a headset, glasses, and a VR device and the like. The terminal device in this embodiment includes a memory 110, a processor 130, and a bone conduction sensor 120. The memory 110 can store a voice signal detection program.

When the terminal device in this embodiment is a headset, the terminal device may further include a microphone, and the microphone is connected to the processor 130.

When the voice signal detection program in the memory 110 is executed by the processor 130, the following steps are implemented:

receiving a time domain signal detected by a bone conduction sensor in the terminal device, and acquiring a time domain feature in the time domain signal;

converting the time domain signal into a frequency domain signal, and acquiring a frequency domain feature in the frequency domain signal; and when the time domain feature satisfies a first preset condition and the frequency domain feature satisfies a second preset condition, determining that a voice signal has been detected by the bone conduction sensor.

Figure 2:
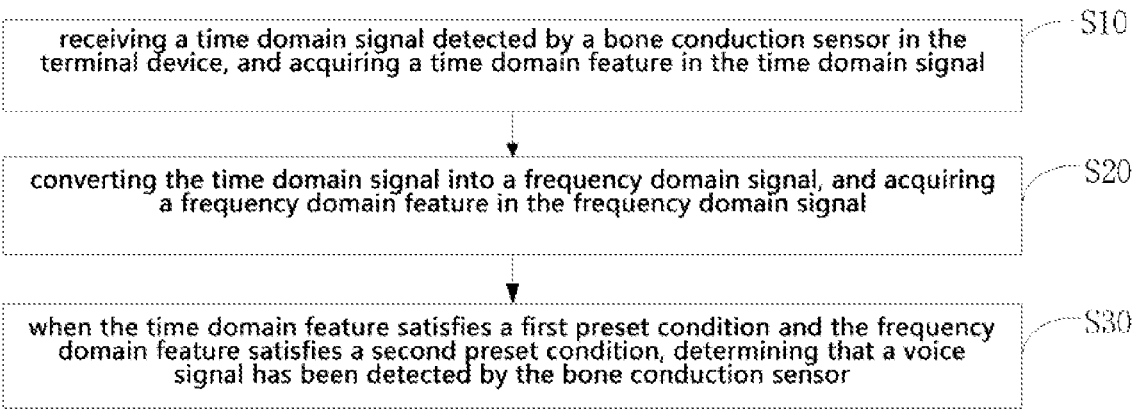
FIG. 2 is a schematic flowchart of an exemplary embodiment of a voice signal detection method of the present application.

Referring to FIG. 2, FIG. 2 is a schematic flowchart of an exemplary embodiment of a voice signal detection method of the present application. In this embodiment, the voice signal detection method includes:

Step S10: receiving a time domain signal detected by a bone conduction sensor in the terminal device, and acquiring a time domain feature in the time domain signal.

Bone conduction is a method of sound conduction, that is, converting sound into mechanical vibrations of different frequencies, and transmitting sound waves through the human skull, bone labyrinth, inner ear lymph, auger, and auditory center. Compared to the conventional sound conduction method that generates sound waves through the diaphragm, bone conduction eliminates many steps of transmitting sound waves, and can achieve clear sound reproduction in noisy environments, and sound waves may not affect others because they diffuse in the air.

The audio signal includes unvoiced sound and voiced sound. By distinguishing unvoiced sound and voiced sound, it can be distinguished whether the signal belongs to voice or noise. In this embodiment, the time domain feature may include a short-term zero-crossing rate and a pitch period, and the short-term zero-crossing rate is the number of times that the signal passes through the zero value per second. If the zero-crossing rate is high, the voice signal is unvoiced sound. If the zero-crossing rate is low, the voice signal is voiced sound. The pitch (fundamental tone) is the periodicity caused by the vibration of the vocal cords when generating voiced sound, and the pitch period refers to a reciprocal of a vibration frequency of the vocal cords.

Correspondingly, when the time domain feature includes a short-term zero-crossing rate and a pitch period, the step of acquiring a time domain feature in the time-domain signal includes: acquiring the short-term zero-crossing rate of the time domain signal; and acquiring the pitch period of the time domain signal. The time domain feature includes the short-term zero-crossing rate and the pitch period.

The corresponding step of acquiring a short-term zero-crossing rate of the time domain signal includes:

acquiring difference values between sign functions of adjacent individual sampling points in the time domain signal, a parameter of the sign function is a sampling signal of the sampling point; and summing up absolute values of the difference values to obtain the short-term zero-crossing rate.

The calculation formula of the short-time zero-crossing rate can be $$Zn = \sum_{m=1}^{m2} |\text{sgn}[x(m)] - \text{sgn}[x(m-1)]|,$$

wherein sgn is a sign function, and the value of sgn can refer to the formula:

$$\text{sgn}[x(n)] = \begin{cases} 1, x(n) \geq 0 \\ 0, x(n) < 0 \end{cases},$$

wherein x(m) is the sampling signal obtained by sampling, and Zn is the short-time zero-crossing rate.

The corresponding step of acquiring the pitch period of the time domain signal includes:

sampling the time domain signal in accordance to a preset period to obtain a sampling signal, and acquiring a reference signal after a preset time interval for the sampling signal; and acquiring a similarity between the sampling signal and the reference signal, and determining the pitch period according to the similarity. It can be understood that the maximum similarity among the similarities may be taken as the pitch period.

The calculation formula of the similarity can be $$Rm = \sum_{m=m1}^{m1} x(n)x(n+m),$$

wherein Rm is the similarity, the formula of the pitch period is

Pitch=max{Rm}, wherein Pitch is the pitch period.

The voice signal detection method includes:

Step S20: converting the time domain signal into a frequency domain signal, and acquiring a frequency domain feature in the frequency domain signal.

The time domain signal can be converted into a frequency domain signal through the fast Fourier transform. The waveform of the time domain signal is the relationship between the time and the amplitude, and the frequency domain signal is the relationship between the frequency and the amplitude. The frequency domain feature in this embodiment may include the spectral center of gravity, and correspondingly, the step of acquiring a spectral center of gravity of the frequency domain signal includes:

acquiring frequencies and spectral energies of sampling points in the frequency domain signal, and acquiring product of the frequency and the spectral energy of each of the sampling points;

summing up the corresponding product of each of the sampling points to obtain a first sum value, and summing up the spectral energy of each of the sampling points to obtain a second sum value; and acquiring a ratio of the first sum to the second sum to obtain the spectral center of gravity.

In this embodiment, the calculation formula of the spectral center of gravity is:

$$\text{brightness} = \frac{\sum_{k=1}^{N} f(k) * E(k)}{\sum_{k=1}^{N} E(k)},$$

wherein brightness is the spectral center of gravity, N is the number of sampling points, N=128, f (k) is the frequency of the sampling point, E(k) is the spectral energy, and the calculation formula of the spectral energy is: $E(k)=|Y(k)|^2$, wherein Y(k) is the amplitude of the frequency domain signal.

The voice signal detection method includes:

Step S30: when the time domain feature satisfies a first preset condition and the frequency domain feature satisfies a second preset condition, determining that a voice signal has been detected by the bone conduction sensor.

When the time domain feature includes a short-term zero-crossing rate and a pitch period, the first preset condition includes that the short-term zero-crossing rate is greater than a preset short-term zero-crossing rate and the pitch period is greater than a first preset pitch period or less than a second preset pitch period. The preset short-term zero-crossing rate may be 0.6, the first preset pitch period may be 94, and the second preset pitch period may be 8. Correspondingly, when the frequency domain feature includes a spectral center of gravity, the second preset condition includes that the spectral center of gravity is greater than a preset spectral center of gravity. The preset spectral center of gravity may be 3.

It can be understood that the frequency domain feature may further include at least one of the logarithmic spectral energy and the spectral energy ratio. Correspondingly, the step of acquiring the frequency domain feature in the frequency domain signal further includes:

acquiring a logarithmic spectral energy of the frequency domain signal; and/or acquiring a spectral energy ratio of the frequency domain signal, the frequency domain feature further includes the logarithmic spectral energy and the spectral energy ratio of the frequency domain signal, and the second preset condition further includes at least one of conditions that the logarithmic spectral energy is less than a preset logarithmic spectral energy and the spectral energy ratio is less than a preset spectral energy ratio.

Correspondingly, the step of acquiring a spectral energy ratio of the frequency domain signal includes:

acquiring amplitudes of sub-frequency domain microphone signals of sub-bands of a frequency domain microphone signal in a first preset frequency band, and determining a first spectral energy according to the amplitudes;

acquiring amplitudes of sub-frequency domain microphone signals of sub-bands of a frequency domain microphone signal in a second preset frequency band, and determining a second spectral energy according to the amplitudes, a highest frequency in the first preset frequency band is less than a lowest frequency in the second preset frequency band; and acquiring a ratio of the first spectral energy to the second spectral energy, and obtaining the spectral energy ratio according to the ratio of the first spectral energy to the second spectral energy.

The 128 KHZ bandwidth of the frequency domain signal is divided into 128 sub-bands. In the 128 sub-bands, 1-24 sub-bands is taken as the first preset frequency band, and 97-128 sub-bands is taken as the second preset frequency band. The calculation formula of the first frequency spectral energy corresponding to the first preset frequency band may be:

$$E_L = \sum_{i=1}^{24} |Y(k)|^2,$$

wherein $E_L$ is the first spectral energy.
The calculation formula of the second spectral energy corresponding to the second preset frequency band may be:

$$E_H = \sum_{i=97}^{128} |Y(k)|^2,$$

wherein $E_H$ is the second spectral energy, and Y(k) is the amplitude of the frequency domain signal.
The calculation formula of the spectral energy ratio is:

$$E_{ratio} = \frac{E_L}{E_H},$$

$E_{ratio}$ is the spectral energy ratio.
The step of acquiring a logarithmic spectral energy of the frequency domain signal includes:
  acquiring amplitudes of sub-frequency domain microphone signals of sub-bands of a frequency domain microphone signal in a third preset frequency band, and determining a third spectral energy according to the amplitudes; and
  obtaining the logarithmic spectral energy by taking logarithm of the third spectral energy.

The 128 KHZ bandwidth of the frequency domain signal is divided into 128 sub-bands. In the 128 sub-bands, 1-24 sub-bands is taken as the third preset frequency band. The calculation formula of the corresponding logarithmic spectral energy is:

$$E_x = \log\left(\sum_{i=1}^{24} |Y(k)|^2\right),$$

wherein Y(k) is the amplitude of the frequency domain signal and Eg is the logarithmic spectral energy.

It may be understood that, the microphone in the terminal device can be turned on when the bone conduction sensor detects the voice signal. It is also possible to perform other preset operations when a voice signal is detected, and the preset operations may be set according to requirements.

In this embodiment, when any of the time domain features does not satisfy the first preset condition or any of the frequency domain features does not satisfy the second preset condition, it is determined that the bone conduction sensor does not detect a voice signal.

In this embodiment, a detection flag may be provided. The detection flag is set to 1 when a voice is detected by the bone conduction microphone. The detection flag is set to 0 when no voice is detected by the bone conduction microphone. It is possible to determine whether to turn on the microphone according to the detection flag. When the detection flag is 1, it means that the user is speaking, at this time the microphone can be turned on, to facilitate lower energy consumption and prevent the microphone from being turned on all the time. Meanwhile, since the microphone is turned on only when it is detected that the user is speaking, the operations triggered by the voice collected through the microphone are more accurate.

The voice signal detection method disclosed in this embodiment receives a time domain signal detected by a bone conduction sensor in the terminal device, acquires a time domain feature in the time domain signal, converts the time domain signal into a frequency domain signal, acquires a frequency domain feature in the frequency domain signal, and when the time domain feature satisfies a first preset condition and the frequency domain feature satisfies a second preset condition, it is determined that the bone conduction sensor detects the voice signal, so that the voice detection can be performed according to the time domain signal detected by the bone conduction sensor, without being combined with the signal detected by the microphone, therefore the voice detection is simpler, in the meanwhile, the cost is lower since only the bone conduction sensor is combined in the recognition for the voice.

The present application also proposes a terminal device, which is characterized in that, the terminal device includes a memory, a processor, and a voice signal detection program stored on the memory and executable by the processor, and when the voice signal detection program is executed by the processor, the voice signal detection method as described in the above embodiments is implemented.

The present application also proposes a computer readable storage medium, which is characterized in that, the computer readable storage medium stores a voice signal detection program thereon, and when the voice signal detection program is executed by a processor, the steps of the voice signal detection method as described above are implemented.

It should be noted that, herein, the terms "comprising", "including" or any other variations thereof are intended to encompass non-exclusive inclusion, such that a process, method, article or system including a series of elements includes not only those elements, but also includes other elements not expressly listed or elements inherent to such a process, method, article or system. Without further limitation, an element defined by the phrase "comprising a . . . " does not preclude the presence of additional identical elements in the process, method, article or system that includes the element.

The above-mentioned serial numbers of the embodiments of the present application are only for description, and do not represent the advantages or disadvantages of the embodiments.

From the description of the above embodiments, those skilled in the art can clearly understand that the method of the above embodiment may be implemented by means of software and a necessary general hardware platform, and of course may also be implemented by hardware, but in many cases the former is a better implementation. Based on such understanding, the technical solutions of the present application may be embodied in the form of software products in essence or the parts that make contributions to the prior art, and the computer software products are stored in the above storage medium (such as ROM/RAM, magnetic disk or CD), including several instructions to make a terminal device (the terminal device may be a mobile phone, a computer, a server, a controlled terminal, or a network device, etc.) to execute the method of each embodiment of the present application.

The above are only the preferred embodiments of the present application, and are not intended to limit the patent scope of the present application. Any equivalent structure or equivalent process transformation made by using the contents of the description and drawings of the present application, or directly or indirectly applied in other related technical fields, is similarly included within the scope of patent protection of this application.

What is claimed is:

1. A voice signal detection method, wherein, the voice signal detection method is applied to a terminal device, the voice signal detection method comprises the following steps:
receiving a time domain signal detected by a bone conduction sensor in the terminal device, and acquiring a time domain feature in the time domain signal, wherein the bone conduction sensor conducts sound by converting sound into mechanical vibrations of different frequencies, and transmitting sound waves through the human skull, bone labyrinth, inner ear lymph, auger, and auditory center;
converting the time domain signal into a frequency domain signal, and acquiring a frequency domain feature in the frequency domain signal; and
when the time domain feature satisfies a first preset condition and the frequency domain feature satisfies a second preset condition, determining that a voice signal has been detected by the bone conduction sensor,
wherein the acquiring the time domain feature in the time domain signal comprises:
acquiring a short-term zero-crossing rate of the time domain signal; and
acquiring a pitch period of the time domain signal, wherein the time domain feature comprises the short-term zero-crossing rate and the pitch period, and the first preset condition comprises that the short-term zero-crossing rate is greater than a preset short-term zero-crossing rate and the pitch period is greater than a first preset pitch period or smaller than a second preset pitch period, and
wherein the acquiring the frequency domain feature in the frequency domain signal comprises:
acquiring a spectral center of gravity of the frequency domain signal, wherein the frequency domain feature comprises the spectral center of gravity, and the second preset condition comprises that the spectral center of gravity is greater than a preset spectral center of gravity.

2. The voice signal detection method according to claim 1, wherein the acquiring the short-term zero-crossing rate of the time domain signal comprises:
acquiring difference values between sign functions of adjacent sampling points in the time domain signal, wherein parameters of the sign functions are sampling signals of the sampling points respectively; and
obtaining the short-term zero-crossing rate by summing up absolute values of the difference values.

3. The voice signal detection method according to claim 1, wherein the acquiring the pitch period of the time domain signal comprises:
sampling the time domain signal in accordance with a preset period to obtain a sampling signal, and acquiring a reference signal after a preset time interval for the sampling signal; and
acquiring a similarity between the sampling signal and the reference signal, and determining the pitch period according to the similarity.

4. The voice signal detection method according to claim 1, wherein the acquiring the spectral center of gravity of the frequency domain signal comprises:
acquiring frequency and spectral energy of each of sampling points in the frequency domain signal, and acquiring product of the frequency and the spectral energy of each of the sampling points respectively;
summing up products of corresponding sampling points to obtain a first sum value, and summing up spectral energies of the sampling points to obtain a second sum value; and
acquiring a ratio of the first sum to the second sum to obtain the spectral center of gravity.

5. The voice signal detection method according to claim 1, wherein the acquiring the frequency domain feature in the frequency domain signal further comprises:
acquiring a logarithmic spectral energy of the frequency domain signal; and/or
acquiring a spectral energy ratio of the frequency domain signal,
wherein the frequency domain feature further comprises the logarithmic spectral energy and the spectral energy ratio of the frequency domain signal, and the second preset condition further comprises at least one of conditions that the logarithmic spectral energy is less than a preset logarithmic spectral energy and the spectral energy ratio is less than a preset spectral energy ratio.

6. The voice signal detection method according to claim 5, wherein the acquiring the spectral energy ratio of the frequency domain signal comprises:
acquiring amplitudes of sub-frequency domain microphone signals of sub-bands of a frequency domain microphone signal in a first preset frequency band, and determining a first spectral energy according to the amplitudes;
acquiring amplitudes of sub-frequency domain microphone signals of sub-bands of the frequency domain microphone signal in a second preset frequency band, and determining a second spectral energy according to the amplitudes, wherein a highest frequency in the first preset frequency band is less than a lowest frequency in the second preset frequency band; and
acquiring a ratio of the first spectral energy to the second spectral energy, and obtaining the spectral energy ratio according to the ratio of the first spectral energy to the second spectral energy.

7. The voice signal detection method according to claim 5, wherein the acquiring the logarithmic spectral energy of the frequency domain signal comprises:
acquiring amplitudes of sub-frequency domain microphone signals of sub-bands of the frequency domain microphone signal in a third preset frequency band, and determining a third spectral energy according to the amplitudes; and
obtaining the logarithmic spectral energy by taking logarithm of the third spectral energy.

8. The terminal device according to claim 1, wherein, the terminal device comprises a memory, a processor, and a voice signal detection program stored on the memory and executable by the processor, and when the voice signal detection program is executed by the processor, the voice signal detection method is implemented.

9. A non-transitory computer readable storage medium, wherein, the computer readable storage medium stores a voice signal detection program thereon, and when the voice signal detection program is executed by a processor, the steps of the voice signal detection method according to claim 1 are implemented.

* * * * *